United States Patent [19]

Van Deraerschot

[11] 4,315,834

[45] Feb. 16, 1982

[54] PROCESS FOR RECOVERING THE SOOT FORMED DURING THE PRODUCTION OF SYNTHESIS GAS BY PARTIAL OXIDATION OF HYDROCARBONACEOUS MATERIALS

[75] Inventor: Raymond K. A. Van Deraerschot, Willebroek, Belgium

[73] Assignee: A.S.E.D., Brussels, Belgium

[21] Appl. No.: 58,395

[22] Filed: Jul. 17, 1979

Related U.S. Application Data

[63] Continuation-in-part of Ser. No. 934,286, Aug. 16, 1978, abandoned.

[30] Foreign Application Priority Data

May 8, 1978 [GB] United Kingdom ............... 45542/77

[51] Int. Cl.$^3$ ............................................... C01B 3/36
[52] U.S. Cl. ..................................... 252/373; 48/212; 48/215; 210/634
[58] Field of Search ..................... 48/197 R, 200, 201, 48/212, 215; 210/21, 633, 634; 252/373

[56] References Cited

U.S. PATENT DOCUMENTS 2,665,980  1/1954  Carbeek ................................ 48/212
3,148,140  9/1964  Kaiser et al. ......................... 48/215

Primary Examiner—Peter F. Kratz

Attorney, Agent, or Firm—Sughrue, Mion, Zinn, Macpeak & Seas

[57] ABSTRACT

This invention relates to a continuous process for separating the soot from the aqueous suspensions containing soot, obtained in the preparation of a synthesis gas, by intimately contacting the aqueous suspension with at least a part of the liquid hydrocarbonaceous material feeding a synthesis gas generator and by recycling into said gas generator the suspension of soot in the liquid hydrocarbonaceous material after separation of a clarified water phase by decantation.

The soot-containing aqueous suspension is brought intimately into contact with the liquid hydrocarbonaceous material by mixing said aqueous suspension and said liquid hydrocarbonaceous material in successive mixing steps, in such a way that a step-wise rising amount of energy is used for said mixing, the energy amount used in the first mixing step being of about 2,100 to 7,200 Joules per kilogram of soot and per second so as to obtain a substantially complete transfer of the soot from the aqueous suspension to the liquid hydrocarbonaceous material and the energy used in the last mixing step being of about 10,800 to 33,500 Joules per kilogram of soot and per second so as to reduce the water content of the liquid hydrocarbonaceous material, the so obtained hydrocarbonaceous material containing substantially all the soot being finally separated from the clarified water phase by decantation.

6 Claims, No Drawings

PROCESS FOR RECOVERING THE SOOT FORMED DURING THE PRODUCTION OF SYNTHESIS GAS BY PARTIAL OXIDATION OF HYDROCARBONACEOUS MATERIALS

This is a continuation in part in fact of my application Ser. No. 934,286 filed on Aug. 16, 1978 and now abandoned.

THE PRIOR ART

For the manufacture of a synthesis gas by partial oxidation of hydrocarbonaceous materials, a hydrocarbonaceous material or a mixture of hydrocarbonaceous materials is reacted with air or oxygen, possibly in the presence of steam, the amount of used oxygen being insufficient for causing a complete combustion of the hydrocarbonaceous material. The obtained gaseous mixture contains mainly hydrogen and carbon monoxide, together with small amounts of steam, carbon dioxide and other gases. It contains also a small amount of carbon in free state, i.e. soot, resulting from an incomplete conversion of the carbon of the hydrocarbonaceous feed in carbon oxides.

The hydrocarbonaceous material used for the manufacture of the synthesis gas by partial oxidation consists generally of a hydrocarbon which may be any hydrocarbon, from natural gas to heavy fuels, or of a mixture of hydrocarbons. Said material may also consist of a hydrocarbonaceous compound containing oxygen or by a mixture of hydrocarbonaceous compounds containing oxygen, possibly mixed with one or more hydrocarbons.

The amount of soot formed in the processes of partial oxidation of hydrocarbonaceous materials depends on several factors. Said amount varies, for example, according to the nature of the hydrocarbonaceous material fed to the synthesis gas generator. The amount of soot is very small, when natural gas or other saturated gaseous hydrocarbons are used as feed; an amount of soot of about 0.2 to 1% by weight of the carbon content of the hydrocarbon feed is formed, when the feed is a light liquid hydrocarbon, such as naphtha, whereas the amount of soot may be of about 1% to 4%, when a heavy liquid hydrocarbon, such as a crude oil or a heavy fuel-oil, is used as feed.

The presence of soot in the synthesis gas is undesirable; it particularly affects the catalytic conversion reactions to which the synthesis gas is subsequently submitted. For example, when the synthesis gas consisting of hydrogen and carbon monoxide is to be used for the manufacture of ammonia, the fine particles of soot which are distributed in the synthesis gas may deposit on the catalyst used for the conversion of carbon monoxide and thus increase too much the pressure drop in the catalyst bed. Moreover, when the free carbon has not been entirely removed, it may induce a foaming of the solution used for decarbonating the gas.

It is thus important to remove the soot from the crude synthesis gas, particularly when the feed material used for the production of the synthesis gas is a heavy hydrocarbon.

The removal of the soot from the crude synthesis gas is easily performed by washing the latter with water, in order to obtain an aqueous suspension which may contain about 0.5 to 4% by weight of soot. The aqueous suspension of soot obtained by washing the crude synthesis gas with water cannot be drained as such, in the form of waste water, since this would create a pollution problem. Furthermore, it is advisable, for economical reasons, to recover the soot by recycling it into the synthesis gas generator.

It is known that the removal of soot from the aqueous suspensions obtained in the production of synthesis gas by partial oxidation of hydrocarbons can be performed by intimately mixing the aqueous suspension with a liquid hydrocarbon. The soot is extracted by the hydrocarbon and it is possible to separate, by decantation, clarified water from a suspension of soot in the hydrocarbon. This process is described, for example, in U.S. Pat. No. 2,665,980.

According to this U.S. patent, at least a part of the hydrocarbon feeding the synthesis gas generator is used for extracting the soot and the obtained suspension of soot in the hydrocarbon is recycled into said generator. This method of removing and recovering the soot gives good results, when the hydrocarbon material used for feeding the synthesis gas generator, part of which is used for extracting the soot, is a light hydrocarbon, such as naphtha. On the contrary, when the hydrocarbon used as feed material is a heavy hydrocarbon and when a part of said heavy hydrocarbon is used for extracting the soot in order to obtain a suspension of soot in the heavy hydrocarbon, it is very difficult to separate the suspension of soot in the hydrocarbon from the aqueous phase.

Since the density of water is only slightly different from that of the heavy hydrocarbon, an emulsion of the two phases is formed so that these phases can hardly be separated from each other. This drawback already appears when the density of the heavy hydrocarbon is more than about 0.93 kg/liter at 15° C.

The poor phase separation has inhibited until now the development of a method for soot separation by directly transferring the soot into a part of the heavy hydrocarbon used for feeding the synthesis gas generator while recycling the soot into the generator, as a suspension in the heavy hydrocarbon.

Since most of the commercial plants for the production of synthesis gas by partial oxidation use a heavy hydrocarbon as feed material, it has become necessary to develop other methods for separating and recovering the soot.

In a commercial process, the soot contained in the aqueous suspension it first transferred into a light hydrocarbon and thereafter, from this light hydrocarbon into a heavy hydrocarbon. The aqueous suspension of soot is mixed with naphtha (light hydrocarbon) and the mixture is sent into a settler in which clarified water is obtained as lower layer and a suspension of the soot in naphtha as upper layer. The naphtha containing the soot is then mixed with a fraction of the heavy hydrocarbon used for feeding the synthesis gas generator and the obtained mixture of soot and hydrocarbons is distilled for removing the naphtha which is recycled. The resulting suspension of soot in the heavy hydrocarbon may then be sent to the synthesis gas generator.

An important drawback of this method is the large energy requirement for the distillation and recovery of the naphtha.

Still other methods have been proposed, in which the aqueous suspension of soot is intimately mixed with a small amount of a hydrocarbon, in order to agglomerate the soot particles which may then be separated from the water by screening. In an industrial embodiment of this method, the aqueous suspension of soot is mixed, in an agglomerating apparatus, with a small amount of the heavy hydrocarbon feeding the synthesis gas generator in order to obtain pellets consisting of soot and hydrocarbon having a diameter of 2 to 5 millimeters. These pellets are separated from a carbon free aqueous phase, which is recycled for washing the crude synthesis gas.

The pellets may then be burnt in a combustion device which is specially designed for this type of pellets. It is also possible to mix said pellets, in a homogenizer, with an additional amount of hydrocarbon, in order to obtain a stable dispersion of fine particles of carbon in the hydrocarbon, said dispersion being either burnt or sent into the synthesis gas generator.

This known method is not simple and needs agglomeration and homogenization devices which require large quantities of energy.

DESCRIPTION OF THE INVENTION

This invention relates to a process for recovering the soot formed during the production of a synthesis gas consisting of a mixture of hydrogen and carbon monoxide, by partial oxidation of hydrocarbonaceous materials, the process according to the invention avoiding the above mentioned disadvantages of the known processes.

The invention relates particularly to a continuous process for separating the soot from the aqueous suspensions containing soot, obtained in the preparation of the synthesis gas, by intimately mixing the aqueous suspension with at least a part of the liquid hydrocarbonaceous material feeding a synthesis gas generator, so as to transfer the soot from the aqueous suspension into the hydrocarbonaceous material and to obtain a suspension of soot in the hydrocarbonaceous material, said suspension being sent to the synthesis gas generator, as at least part of the feed of said generator.

The process according to this invention is thus of the known type in which the soot is separated from the aqueous suspensions obtained in the production of synthesis gas by intimately contacting said aqueous suspension with at least a part of the liquid hydrocarbonaceous material feeding a synthesis gas generator and in which, after separation of a clarified water phase by decantation, the suspension of soot in the liquid hydrocarbonaceous material is recycled into said generator.

It has been found that it is surprisingly possible to obtain a good separation of the aqueous phase from the organic phase by decantation, when a hydrocarbon having any density (higher or lower than water density) is used for extracting the soot from the aqueous phase, when the aqueous suspension of soot is intimately brought into contact with the hydrocarbon (organic phase) in a step-wise manner, such a step-wise contact being obtained by supplying, for the mixing of the aqueous and organic phases, increasing amounts of energy comprised between well defined limits.

It is preferred to use a hydrocarbon having a density lower than about 0.97 kg/liter or greater than 1.00 kg/liter at 15° C. for the extracting.

The soot-containing aqueous suspension is brought into contact with the liquid hydrocarbonaceous material by mixing said aqueous suspension and said liquid hydrocarbonaceous material in successive mixing steps, in such a way that a step-wise rising amount of energy is used for said mixing, the energy amount used in the first mixing step being of about 2,100 to 7,200 Joules per kilogram of soot and per second so as to obtain a substantially complete transfer of the soot from the aqueous suspension to the liquid hydrocarbonaceous material and the energy used in the last mixing step being of about 10,800 to 33,500 Joules per kilogram of soot and per second so as to reduce the water content of the liquid hydrocarbonaceous material, the so-obtained hydrocarbonaceous material containing substantially all the soot being finally separated from the clarified water phase by decantation.

It has been found that, when the amount of energy used in the mixing step is below the above mentioned critical minimum range, it is not possible to obtain a good mixture of the hydrocarbon with the soot containing aqueous suspension, whereas a viscous mixture having the consistency of a fluid paste is obtained when the amount of energy used for the mixing is beyond the above mentioned critical maximum range. In both cases, it is not possible to obtain a good separation of the two phases (aqueous and organic phases) by decantation.

The step-wise mixing according to this invention is preferably performed in two steps, the amount of energy used for the mixing being of about 2,100 to 7,200 Joules per kilogram of soot and per second during the first step and about 10,800 to 33,500 Joules per kilogram of soot and per second during the second step.

This step-wise mixing allows to obtain a better separation of the aqueous and organic phases than a one-step mixing using a progressively rising amount of energy comprised between the above mentioned limits.

According to a particular feature of the invention, the amount of energy used at the end of the mixing period must be at least 1.5 times the amount of energy used when the mixing is started, the amount of energy at the end of the mixing being preferably from about 2.5 to 4 times that used initially.

The process according to this invention enables to obtain a good suspension of soot in the hydrocarbonaceous material as well as a good separation of this suspension from a clarified aqueous phase, whatever be the density of the used hydrocarbonaceous material, even when the used hydrocarbonaceous material is a heavy hydrocarbon having a density at 15° C. lower than about 0.97 kg/liter or greater than 1.00 kg/liter.

The hydrocarbonaceous material used, in accordance with the process of this invention, consists of at least a part of the liquid hydrocarbonaceous material feeding the synthesis gas generator. The amount of said hydrocarbonaceous material must be sufficient to obtain a pumpable suspension of soot in said hydrocarbonaceous material. This means that the weight of said hydrocarbonaceous material per time unit should preferably be at least 6 times, most preferably at least 10 times, the weight of the soot treated per unit.

The amount of hydrocarbonaceous may consist of the total amount or only a fraction of the total amount of hydrocarbonaceous material fed to the synthesis gas generator.

For reasons of energy conservation, it is preferable, according to this invention, to use only a fraction of the total amount of hydrocarbonaceous material feeding the generator, said fraction being preferably equal to about 20 to 50% by weight of the liquid hydrocarbonaceous material sent into the generator, most preferably about 30 to 50% of said weight.

The hydrocarbonaceous material used both for feeding the synthesis gas generator and for separating the soot by the process according to this invention may consist of any liquid hydrocarbonaceous compound or mixture of such compounds which are suitable for the production of a synthesis gas by partial oxidation, such as hydrocarbons or hydrocarbonaceous compounds containing oxygen, provided that these compounds are not soluble in water.

This hydrocarbonaceous material may also consist of a dispersion or a slurry of fine solids, such as carbon particles or coal, in one or more liquid hydrocarbonaceous compounds. Particularly, it is possible, for recycle units operating at atmospheric pressure, to use heavy hydrocarbons, such as the residues of the atmospheric or vacuum distillation of petroleum or petroleum fractions or crude mineral oil. These materials may, but need not, have a density at 15° C. less than about 0.97 kg/liter or more than 1.00 kg/liter. Heavy hydrocarbons may also be used when the operating pressure is above 1 atmosphere, which allows the use of temperatures higher than 100° C.

Heavy hydrocarbons commonly used for industrial production of synthesis gas contain about 85% by weight of carbon and about 11% by weight of hydrogen. They may, for example, have a hydrogen/carbon ratio of about 0.13 to 0.12.

The process according to this invention is a continuous process and not a batch process, i.e., the mixing steps are performed successively in a continuous way.

Any type of mixer which is suitable for enabling a continuous step-wise mixing of the mixture may be used for contacting intimately the aqueous suspension of soot with the liquid hydrocarbonaceous material. Conventional mixers with low or high speed rotary stirrers or other types of mixers in which the mixing is obtained in a different manner may be used, for example perforated plates, bundles of small tubes, hollow-cone or plain-cone sprayers, expansion valves, static spiral mixers or static mixers wherein the liquids flow in parallel layers.

The aqueous and organic phases may be mixed at different temperatures and pressures, which are namely dependent of the viscosity of the used liquid hydrocarbonaceous material at the mixing temperature. The temperatures may be comprised between about 60° to 205° C.

The selection of a high temperature may reduce the viscosity of the hydrocarbonaceous material and make therefore the separation of the phases easier. A high pressure, on the other hand, enables the use of hydrocarbons having a lower boiling point or the use of a higher temperature. When a residue of the atmospheric distillation of petroleum is used as liquid hydrocarbon material, said residue may, for example, be mixed with the soot containing aqueous suspension at a temperature of about 60° C. and at atmospheric pressure, whereas when a residue of the vacuum distillation of petroleum is used, the organic phase and the aqueous phase may, for example, be mixed at a temperature of at least 180° C. and under a pressure higher than the equilibrium boiling pressure of the water phase.

The mixture which is obtained by continuously intimately contacting, in accordance with this invention, the aqueous suspension of soot with the liquid hydrocarbonaceous material is then decanted or allowed to settle, in order to separate clarified water from a suspension of soot in the hydrocarbonaceous material. According to the density of the hydrocarbonaceous material, the suspension of soot in the hydrocarbonaceous material forms an upper layer which is lighter than the aqueous phase or a lower layer which is heavier than water. The separation of the two phases may also be performed by other means, for example by centrifugation.

When the hydrocarbonaceous material has a density which is lower than or equal to about 0.97 kg/liter, said hydrocarbonaceous material forms with the soot, at the temperature used in the process, e.g., at a temperature of about 70° C. and under atmospheric pressure, a suspension which is lighter than water and appears, after decantation, as an upper layer, whereas when the density of the hydrocarbonaceous material is preferably higher than 1.00 kg/liter at 15° C., the formed organic suspension is heavier than water at 70° C. and appears, after decantation, as the lower layer.

For settlers operating under pressure above the atmospheric pressure other densities depending on the temperature of the settler will be determinant for the way the hydrocarbon phase will be withdrawn.

The clarified water phase obtained by decantation is substantially free from soot and may advantageously be recycled into the plant for the production of synthesis gas, for the purpose of washing the crude sysnthesis gas.

The suspension of soot in the hydrocarbonaceous material is sent to the synthesis gas generator, where it is used at least as a part of the feeding material. The soot is thus recovered and used for the production of the synthesis gas.

The suspension of soot in the hydrocarbonaceous material which has been separated by decantation contains some water, the water content of said suspension being of about 10% by weight. This suspension, possibly mixed with an additional quantity of hydrocarbonaceous material, may be used as feed material for the synthesis gas generator, the presence of water being not a drawback. On the contrary, it is known that the presence of a certain amount of water in the feed of the synthesis gas generator is advantageous, since it decreases the amount of soot which is formed during the production of synthetic gas.

The liquid hydrocarbonaceous material and the aqueous soot-containing suspension to be used in the process according to this invention are sent, respectively by pumps to a first mixer in which they are submitted to any energy amount of about 2,100 to 7,200 Joules per kilogram of soot and per second, in such a way that a substantially complete transfer of the soot from the aqueous suspension into the liquid hydrocarbonaceous material is effected. The obtained mixture is then sent to a second mixer wherein it is submitted to an energy amount of about 10,800 to 33,500 Joules per kilogram of soot per second in order to reduce the water content of the liquid hydrocarbon phase which contains substantially all the soot extracted from the aqueous suspension.

The so treated mixture is then sent to a settler in which two phases are formed, i.e. a clarified water phase and an hydrocarbon phase, the latter containing all the soot, said phases being removed from the settler as two separate streams.

The process according to this invention has several advantages. This process is a simple and economical process for recovering the soot from aqueous suspensions obtained during the production of synthesis gas by partial oxidation of heavy hydrocarbons.

Compared to the commercial process consisting in transferring first the soot of the aqueous suspension into a light hydrocarbon, such as naphtha, and then in the heavy hydrocarbon feeding the synthesis gas generator, the process according to this invention, in which the soot is directly transferred into the heavy hydrocarbon used as feed material to the synthesis gas generator allows important energy savings, due to the fact that the expensive step of separating and recovering the naphtha is avoided.

The process according to this invention is also much more simple and economical than the known method consisting in the agglomeration of the soot, by means of a small amount of the hydrocarbon used as feed material to the generator, in order to obtain pellets which must then be sent in a homogenizer with an additional amount of the hydrocarbon to obtain a dispersion of soot which is sent to the synthesis gas generator. By using the process according to this invention, there is no need for expensive agglomeration and homogenization devices, which, on the other hand, also require energy for their operation.

As already pointed out, the process according to this invention allows a good separation, by decantation or centrifugation, of the suspension of soot in the hydrocarbon, from a clarified water phase. There is no need to use an additive, such as a wetting agent, for making the separation easier.

EXAMPLES

The invention is illustrated by the following non limitative examples.

EXAMPLES 1 to 3

In these examples a heavy fuel having a density of 0.95 kg/liter at 15° C. has been used as feed hydrocarbon material for the production of a synthesis gas by partial oxidation of said heavy fuel.

The aqueous suspension of soot obtained by washing the crude synthesis gas with water has been intimately brought into contact with a fraction of the heavy fuel sent to the synthesis gas generator, in two mixers in which the mixture has been subjected to a step-wise increasing mixing action.

The resulting mixture has then been sent in a settler, under atmospheric pressure, wherein a lower layer of a clarified aqueous phase practically free from soot and an upper layer of a suspension of soot in the heavy fuel have been obtained.

The suspension of soot in the heavy hydrocarbon has been sent to the synthesis gas generator.

The step-wise mixing which has created an intimate contact between the aqueous suspension of soot and the heavy fuel and has been performed under the conditions defined in the following table I, has given a good separation by decantation of the aqueous phase, form the suspension of the soot in the heavy fuel.

TABLE I

OPERATING CONDITIONS IN THE MIXER AND SETTLER.

| CONDITIONS | EXAMPLES | | |
|---|---|---|---|
| | 1 | 2 | 3 |
| Flow rate of the aqueous suspension of soot in kg/hour | 24,000 | 24,000 | 24,000 |
| Soot content of the aqueous suspension, in g/kg of suspension | 15 | 15 | 25 |
| Temperature of the aqueous suspension of soot, in °C. | 70 | 70 | 70 |
| Flow rate of fuel in kg/hour | 12,000 | 6,000 | 12,000 |
| Temperature of the fuel in °C. | 70 | 70 | 70 |
| Density of fuel in kg/litre at 15° C. | 0.95 | 0.95 | 0.95 |
| Pressure in the settler in atmospheres (gauge) | 0 | 0 | 0 |
| Soot content of the fuel at the outlet of the settler, in g/kg of fuel | 30 | 60 | 50 |
| Energy supplied during the first step of the mixing, in Joules/kg of soot | 5,904 | 4,680 | 3,528 |
| Energy supplied per hour in the first mixing step in Joules per hour | 2,125,440 | 1,684,800 | 2,116,800 |
| Energy supplied during the second step of the mixing, in Joules/kg of soot | 18,612 | 15,516 | 11,160 |
| Energy supplied per hour in the second mixing step in Joules per hour | 6,700,320 | 5,585,760 | 6,696,000 |

EXAMPLES 4 to 6

In these examples, a heavy vacuum residue having a density of 1.044 kg/liter at 15° C. has been used as feed hydrocarbonaceous material for the production of a synthesis gas by partial oxidation.

The operation was the same as for example 1 to 3, but the hydrocarbon was kept at a temperature of 165° C. before mixing, in order to ensure pumpability of the hydrocarbon. The carbon slurry containing 0.015 kg of soot/kg of slurry was introduced at a temperature of 165° C.

The whole system, settlers included, was kept under a pressure of at least 10 bar in order to avoid boiling up of the water phase.

During these tests, the hydrocarbon phase was leaving the settler by the bottom, whereas the water phase was leaving the settler by the upper part.

The pressure drop in the first mixer has been as follows:

| EXAMPLE | Measured pressure drops in kg/cm² | Corresponding energy input in Joules/kg soot | Energy supplied in Joules/second |
|---|---|---|---|
| 4 | 0.590 | 5,985 | 598.5 |
| 5 | 0.575 | 4,848 | 487.3 |
| 6 | 0.585 | 3,558 | 355.8 |

The pressure drop in the second mixer has been as follows:

| Example | Measured pressure drops in kg/cm² | Corresponding energy input in Joules/kg soot | Energy supplied in Joules/second |
|---|---|---|---|
| 4 | 1.882 | 19,089 | 1908.9 |
| 5 | 1.895 | 15,980 | 1598 |
| 6 | 1.893 | 11,481 | 1148.1 |

COMPARATIVE EXAMPLES

It is possible to compare the results obtained (1) when the mixing of the liquid hydrocarbonaceous material with the aqueous suspension is effected in one step, as disclosed in U.S. Pat. No. 3,148,140 and (2) when the mixing of both materials is performed in two steps using different energy input ranges in each of the two steps.

Considering first the one step operation:

(a) when the energy input is lower that 2,000 Joules/kg soot per second, large layers of aqueous and hydrocarbonaceous phases are obtained, without any noticeable transfer of carbon from the aqueous suspension into the liquid hydrocarbonaceous material;

(b) when the energy input is comprised between 2,000 and about 10,000 Joules/kg soot per second, the water phase is practically free of hydrocarbonaceous material and of free carbon (soot), but although all the free carbon has been transferred into the hydrocarbonaceous phase, this phase contains about 30% of water and is thus not suitable for feeding a synthesis gas generator.

(c) when the energy input is of about 35,000 Joules/kg soot per second, the hydrocarbonaceous phase only contains about 7% by weight of water, the content of hydrocarbonaceous material in the water phase being however higher than in the case where the energy input is of about 10,000 Joules/kg soot per second, whereas the aqueous phase contains a noticeable amount of free carbon at the exit of the settler (d) when the energy input is of about 70,000 Joules/kg soot per second, the hydrocarbonaceous and aqueous phases get emulsified and it is not possible to separate these phases in a settler, at least not within a practically suitable time, the free carbon (soot) initially contained in the aqueous suspension being spread over the whole mixture, whereas, when decanted, the aqueous phase still contains about 0.33 to 0.66% by weight free soot.

From the above considerations, it is thus clear that it is not possible, whatever be the energy input, to obtain, in one step, a liquid hydrocarbonaceous material containing a low content of water and all the carbon initially contained in the soot aqueous suspension, i.e. a liquid hydrocarbonaceous material which can be used for feeding a synthesis gas generator.

Considering now a two-step operation according to this invention:

(a) When an energy input of 2,100 to 7,200 Joules/kg soot and per second is used in the first mixing step, the hydrocarbon phase contains 30 to 50% by weight of water, whereas the aqueous phase is practically free of oil and of free carbon (soot); this means that all the free carbon has been transferred in the hydrocarbonaceous phase and remains in this phase, when the latter is sent together with the aqueous phase to the second mixer.

(b) when an energy input of 10,000 to 35,000 Joules/kg soot and per second is used in the second step, it appears that the water content of the hydrocarbonaceous phase drastically decreases without practically no back transfer of soot from this hydrocarbonaceous phase to the aqueous phase.

The water content is surprisingly decreased to a value of 7% by weight when the energy input is of 35,000 Joules/kg soot per second, so that the soot-containing hydrocarbonaceous phase, when separated from the aqueous phase (which contains a small amount of hydrocarbonaceous material) in the settler, can be used for feeding a synthesis gas generator.

The two step process according to this invention thus enables not only to recover in the hydrocarbonaceous phase substantially all the soot contained in the aqueous phase, but also reduce unexpectedly the water content (30 to 50%) of the liquid hydrocarbonaceous phase obtained in the first mixing step to about 7% by weight after the second mixing step. This effect has an important economic value, since the heat of combustion of the hydrocarbonaceous material in the phase containing said hydrocarbonaceous material together with the soot and only 7% by weight of water is about 5% higher that the heat of combustion of the hydrocarbonaceous material contained in a phase containing that material together with the soot and about 40% by weight of water, due to the fact that much more water must be evaporated.

It is also clear that a one-step operation can only achieve either low free carbon content in the aqueous phase obtained in settlers or a low water content in said hydrocarbonaceous phase, but that both results can only be achieved simultaneously by using a two-step mixing in accordance with this invention.

What I claim is:

1. A continuous process for separating soot from an aqueous suspension containing said soot obtained in the preparation of a synthesis gas which comprises intimately contacting, at a temperature between about 60° and 205° C., the aqueous suspension with at least a part of a liquid hydrocarbonaceous material having a density of less than about 0.97 kg/liter or more than 1.00 kg/liter at 15° C. feeding a synthesis gas generator and recycling into said gas generator the suspension of soot in the liquid hydrocarbonaceous material after separation of a clarified water phase by decantation, the aqueous suspension containing the soot being continuously brought intimately into contact with the liquid hydrocarbonaceous material in an amount of at least 10 times the weight of the soot contained in the aqueous suspension so as to obtain a pumpable suspension of soot in said hydrocarbonaceous material by mixing all the aqueous suspension and all the liquid hydrocarbonaceous material in two successive continuous steps effected in two separate static mixers in serial order in such a way that a step-wise rising amount of energy is used for said mixing, the energy amount used in the first mixing step being about 2,100 to about 7,200 Joules per kilogram of soot and per second so as to obtain a substantially complete and continuous transfer of the soot from the aqueous suspension to the liquid hydrocarbonaceous material, and the energy amount used in the second mixing step being about 10,800 to about 33,500 Joules per kilogram of soot and per second so as to reduce the water content of the liquid hydrocarbonaceous material to such an extent that the obtained hydrocarbonaceous material, containing substantially all the soot and having a low water content which is separated from the clarified aqueous phase by decantation can be recycled into said gas generator whereas the aqueous phase is clear and can be disposed of.

2. The process of claim 1, wherein the amount of soot formed in the preparation of a synthesis gas is about 0.2 to about 4%.

3. The process of claim 1, wherein the preparation of the synthesis gas is a partial oxidation of hydrocarbonaceous materials to yield a mixture comprising hydrogen, carbon monoxide and said soot.

4. The process of claim 1, wherein the amount of hydrocarbonaceous material consists of a fraction of the total amount of hydrocarbonaceous material fed to the synthesis generator.

5. The process of claim 4, wherein said fraction is of about 20 to 50% by weight of the liquid hydrocarbonaceous material sent into the generator.

6. The process of claim 1, wherein the amount of hydrocarbonaceous material consists of the total amount of hydrocarbonaceous material fed to the synthesis gas generator.

* * * * *